United States Patent [19]

Tsao

[11] Patent Number: 4,688,050

[45] Date of Patent: Aug. 18, 1987

[54] THERMAL TRANSFER PRINTING SYSTEM

[75] Inventor: Chein-Hwa S. Tsao, San Ramon, Calif.

[73] Assignee: Xerox Corporation, Stamford, Conn.

[21] Appl. No.: 894,431

[22] Filed: Mar. 10, 1986

Related U.S. Application Data

[63] Continuation of Ser. No. 663,111, Oct. 22, 1984, abandoned.

[51] Int. Cl.[4] .............................................. G01D 15/10

[52] U.S. Cl. ................................ 346/76 PH; 400/706

[58] Field of Search ......................... 346/76 PH, 76 R; 219/216 PH; 400/120, 703, 705, 706, 707-707.6; 250/548, 317.1, 318, 319, 201, 202

[56] References Cited

U.S. PATENT DOCUMENTS

| | | | |
|---|---|---|---|
| 4,025,025 | 5/1977 | Bartel et al. | 250/548 |
| 4,232,324 | 11/1980 | Tsao | 346/75 |
| 4,255,754 | 3/1981 | Crean et al. | 346/75 |
| 4,284,876 | 8/1981 | Ishibashi et al. | 219/216 |
| 4,385,302 | 10/1985 | Moriguchi et al. | 346/76 PH |
| 4,468,134 | 8/1984 | Hattori | 400/120 |

FOREIGN PATENT DOCUMENTS

| | | | |
|---|---|---|---|
| 0069066 | 4/1982 | Japan | 346/76 PH |
| 0069065 | 4/1982 | Japan | 346/76 PH |

*Primary Examiner*—Arthur G. Evans

*Attorney, Agent, or Firm*—Richard A. Tomlin; Serge Abend

[57] ABSTRACT

A thermal transfer printing system in which a print scanning head is provided with a series of thermal heating elements. The elements are aligned in a column perpendicular to the line of printing. A sensor is provided to determine where the scanning head is aligned perpendicularly relative to the line of printing. More heating elements are provided on the head than are required for printing. Only those heating elements properly aligned with the line of printing are activated.

6 Claims, 7 Drawing Figures

THERMAL TRANSFER PRINTING SYSTEM

This is a continuation of application Ser. No. 663,111, filed Oct. 22, 1984, now abandoned

BACKGROUND OF THE INVENTION

The present invention elates to a thermal transfer printing system and, in particular, to a thermal transfer printing system which lessens the requirement for a precisely positioned record receiving surface.

A thermal transfer recording system utilizes a scanning head on which a column of thermal heat elements is provided. The heat elements are arranged perpendicularly to the line of printing. A thermal transfer material bearing sheet or ribbon is maintained in close contact to the elements during scanning head traverse. A record receiving member is provided in contact with the thermal transfer material. The record receiving sheet is entrained over a platen. The platen is used to move the record receiving member stepwise a line of printing. It has been found that for accurate stitching, that is, for accurate positioning of the transferred marks relative to each other for sequential lines of printing, the record receiving sheet must be precisely controlled. If the sheet stepping movement is not precise, error in stitching will occur. This requires highly accurate and inherently more expensive record receiving member advancing mechanisms.

SUMMARY OF THE INVENTION

The present invention is to provide a remedy for the above requirement by providing a scanning head having more elements than are required by the line of printing and by using a detector to determine which elements are accurately aligned with the line of printing and should be activated.

BRIEF DESCRIPTION OF THE DRAWING

The invention will better be understood upon reading the specification and particularly when the specification is considered in conjunction with the accompanying drawing, which is not drawn to scale, wheren.

DESCRIPTION OF THE PREFERRED EMBODIMENT

Figure 1:
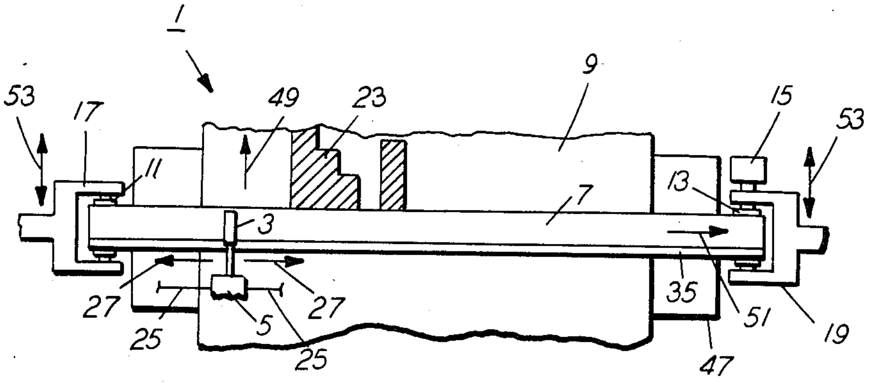
FIG. 1 shows an overall view of a scanning carriage thermal transfer printer in accordance with this invention.

Referring now to FIG. 1, there is shown a scanning head thermal transfer printer shown generally as 1. Scanning head thermal transfer printer 1 utilizes a thermal printhead, shown generally as 3, mounted on scanning carriage 5. A thermal transfer ink donor ribbon 7 is provided between thermal printhead 3 and record receiving 9. Record receiving surface 9 may be, for example, a sheet of paper backed by a platen 47 or other suitable support member. Thermal transfer ink donor ribbon 7 is provided on ribbon supply spool 11 and is wound up on ribbon take-up spool 13. Take-up spool 13 is rotated by drive motor 15. Ribbon supply spool 11 and take-up spool 13 are rotatably supported by ribbon lift arms 17 and 19, respectively. Thermal print-head 3 is provided with a series of heating elements 21 (see FIG. 3), which may be individually actuated to heat ink donor ribbon 7 in imagewise configuration transferring ink to record receiving surface 9 and forming an image 23 thereon. The drive circuitry for individually actuating heating elements 21 to form images is well known in the art. Scanning carriage 5 is pulsed, for example, by cables 25 such that it traverses record receiving surface 9 in the directions shown by arrows 27 in FIG. 1 parallel to the line of printing and perpendicular to the direction of movement of record receiving surface 9.

In operation, drive motor 15 is activated to move ink donor ribbon 7 in a direction shown by arrow 51 to provide unused ink donor ribbon between thermal printhead 3 and record receiving surface 9 after each traverse of the printhead 3 across the width of the record receiving surface 9. Individual elements 21(see FIG. 3)are heated as required by the image to be formed. The record receiving surface 9 is stationary during printing. On completion of a printhead scan of the line of printing, which may be one or more passes with printing occurring during left to right, right to left or both direction traverse, record receiving surface 9 is advanced by platen 47 stepwise in direction 49 to receive the next line of printing. To provide graphic images, it is necessary that elements 21 traverse the entire image receiving portion of record receiving surface 9. Record receiving surface 9 is conventionally advanced in the direction shown by arrow 49 a distance equal to the length of the array of heating elements 21. Because a single image may be made up of a plurality of printing passes at different record receiving surface 9 positions, it is necessary that the stepwise movement of the platen 47, which is used to advance record receiving surface 9, be precise to ensure proper stitching in the final images 23 and to not leave gaps or dark lines in the images parallel to the line of printing. For example, if the platen 47 advances record receiving surface 9 further than required for proper stitching, a gap will appear in the final image 23 parallel to the line of printing. If record receiving surface 9 is not advanced far enough for proper stitching, a portion of the image will have a double density resulting from over printing causing a dark line to appear in the final image 23 parallel to the line of printing. To avoid these problems, it is necessary to utilize a relatively expensive control mechanism for advancing record receiving surface 9. There can still be problems, however, due to slippage of the record receiving member 9 or wear of mechanical parts.

To ensure proper stitching of images, it is necessary to precisely align the heating elements 21 on the printhead 3 and the record receiving surface 9. The printhead 3 of the present invention is provided with more heating elements 21 than are required to form a line of printing. Only those heating elements 21 which are aligned for proper stitching are utilized for printing on any given scan. In order to determine which heating elements are properly aligned for the line of printing, a registration line 31 is formed on the record receiving surface by printhead 3 during its print scan pass. After record receiving surface 9 has been advanced in preparation for the next print scan, a registration line detector 33 on printhead 3 is used to determine the position of printhead 3 relative to registration line 31. The signal from detector 33 is used to control which ones of heating elements 21 are to be used for that print scan pass. The process is repeated for each increment of record receiving member 9 advance.

Figure 2A:
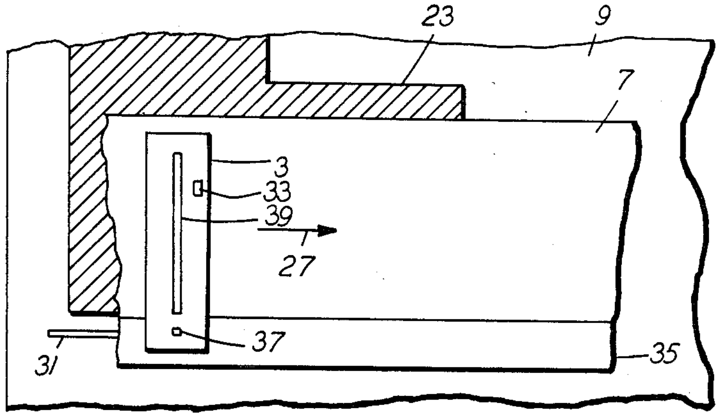
FIG. 2A shows the position of the thermal transfer ribbon and thermal printhead during the print operation.

Referring now to FIGS. 1 and 2A, in order to provide a registration line 31, which will not interfere with formation of final image 23 or leave visible marks on the record receiving surface 9, a thermal ink donor ribbon 7 is provided with a strip 35 of unpigmented or undyed heat transferable material. Thermal transfer ink donor ribbons 7 have a transferable material coated thereon made of a dyed or pigmented wax or resin material which, on application of heat, softens or melts and adheres to the record receiving surface 9. Strip 35 may be coated with the same type of material but is colorless. The coatings are on the surface of ink donor ribbon 7 facing record receiving surface 9. Heating element 37 is provided to heat strip 35 so that a registration line 31 is formed as printhead 3 is traversed in the direction shown by arrow 27. If the printhead 3 is returned to, for example, the extreme left as shown in FIG. 2A, at the end of each scan, it is necessary only to activate registration line heating element 37 for a short distance at the left side of record receiving surface 9.

Figure 2B:
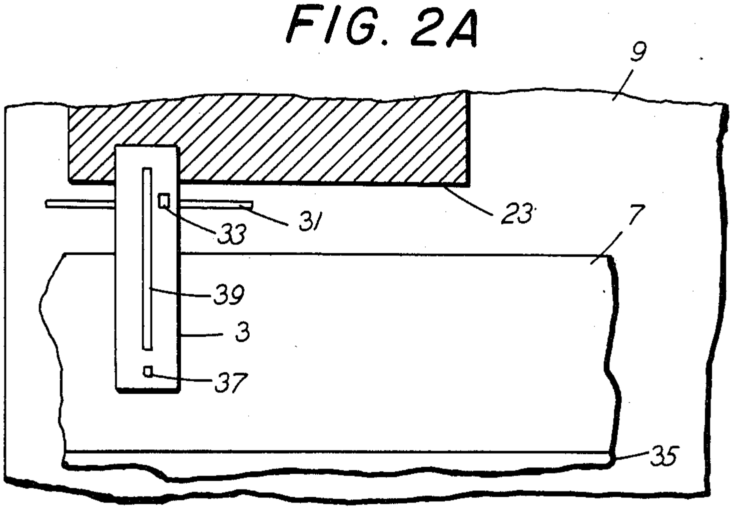
FIG. 2B shows the position of the thermal transfer ribbon and thermal printhead during the alignment sensing operation.

Referring now to FIGS. 1, 2A and 2B, after completion of a print scan traverse, record receiving member 9 is stepped a print line distance, the distance being less than the printing height of the array 39 of heat elements 21. The thermal transfer ink donor ribbon 7 is then lowered by lifting arms 17 and 19 to the position shown in FIG. 2B. Lift arms 17 and 19 are provided to move the ink donor ribbon 7 in the directions shown by arrow 53. In the lower position, the ink donor ribbon 7 is moved out of its normal position between printhead 3 and record receiving member 9 allowing registration line detector 33 to "see" registration line 31 formed on record receiving surface 9. The heating elements 21, which are then activated to be used for printing, are determined depending on detector 33 output. If the record receiving surface has advanced too far, the upper set of heating elements would be used for printing; if the detector signal indicates the record receiving member is correctly located, the middle group of heating elements 21 would be used; and if the record receiving surface 9 was not advanced far enough, the lower group of heating elements 21 would be used.

Figure 3:
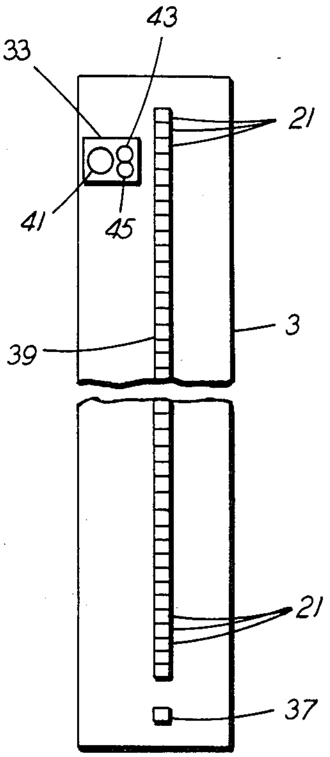
FIG. 3 shows the face of a thermal printhead in accordance with the present invention.

Referring now to FIG. 3, the face of a printhead 3 is shown greatly enlarged. Registration line detector 33 is shown as having a source of illumination 41 may be, for example, the end of an optical fiber for transferring illumination from a remote light emitting diode (not shown) to registration line 31. Upper detector 43 and lower detector 45 may be, for example, the end of optical fibers for transmitting radiation reflected from registration line 31 and record receiving surface 9 to remote photodiodes (not shown). Preferably, the light emitting diode is a source of infrared radiation, and the photodiodes are infrared sensitive. The infrared region is preferred where a resin or wax without pigment or dye is transferred to form registration line 31. The detectors 43, 45 detect the difference in reflectivity between the registration line 31 and record receiving surface 9.

Figure 4A:
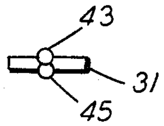
FIGS. 4A,4B,4C are representations of the alignment detector and registration line at three different alignment positions.
Figure 4B:
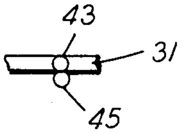
Figure 4C:
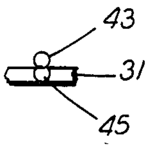

Referring now to FIGS. 4A–C, there are shown representations of upper and lower detectors 43, 45 and registration line 31 relationships. Where record receiving surface 9 has been advanced a correct distance, upper detector 43 and lower detector 45 are illuminated equally providing equal output signals as shown in FIG. 4A.

As represented in FIG. 4B where record receiving surface 9 has been advanced too far, the signal produced by upper detector 43 will be different from that of lower detector 45. For example, if registration line 31 is more reflective than the background of record receiving surface 9, detector 43 output signal will be greater than detector 45. The reverse would be true if record receiving member 9 were not advanced far enough as seen in FIG. 4C. The signals from upper detector 43 and lower detector 45 are compared with, for example, a linear differential amplifier whose output is an analog signal proportional to registration line 31 displacement. This signal is converted to a digital signal by an analog-to-digital converter (not shown) and is fed to a controller (not shown), which activates the specific heating elements 21, which will be used for printing during that scan.

In an example, the array 39 of heating elements has 240 heating elements per inch with three additional heating elements provided at either end so that the array measures slightly over one inch and contains 246 heating elements. Only 240 heating elements are required for printing since the record receiving surface 9 is advanced in one inch increments. Assuming the heating elements 21 are numbered with the top element 21 (as shown in FIG. 3) being 1 and the bottom element being 246, where there is no registration line 31 displacement, heating elements 4 through 243 are used. Where the registration line 31 is at the upper extreme, as shown in FIG. 4B, heating elements 1 through 240 are used and, at the bottom extreme, elements 7 through 246 are used for printing. In this case, three digital signal lines could be used to provide seven different sets of heating elements 21. The system of this invention can provide a stitching accuracy of $\pm\frac{1}{2}$ pixel, which, in this instance, is $\pm 2.1$ mil. The specific hardware implementation of heating element selection can be accomplished with digital logic circuits included on printhead 3; for example, programmable counters, high-speed, serial-in and parallel-out shift registers, all of which are well known in thermal printhead technology.

Although a specific embodiment has been disclosed, other modifications can be made. For example, the ink donor ribbon 7 and ribbon supply spool 11 and ribbon take-up spool 13 could be provided in a ribbon cartridge mounted on the scanning carriage 5 for scanning movement with the printhead 3. The ribbon cartridge would then be raised and lowered to raise and lower the ink donor ribbon 7. Also, in certain instances there may be utilizations for the printer where it may be acceptable to use the ink donor ribbon 7 itself without strip 35 for registration line 31 forming.

Further, although the invention has been described in connection with thermal transfer printing only, the same principle may be applied to other printing technologies. For example, printhead 3 could be an ink jet printhead with ejector nozzles substituted for heating elements 21 and 37. In this case, however, the ink ejector nozzle corresponding to heating element 37 would have a separate supply of a fluid that would contain an infrared absorptive or infrared reflective material with which to form registration line 31. Similarly, heating elements 21 and 37 could be replaced with electrostatographic elements. In this case, element 37 would form a registration line of electrostatic charge on record receiving surface 9. The infrared detector 33 would be replaced by an electrical charge detector. It would, of course, also be necessary to erase the registration line charge if images are to be formed in that location.

Also, obviously combinations of the above could be used where, for example, an ink jet nozzle 37 is used to provide a registration line for thermal heating elements 21. Such modifications are considered to be within the scope of this invention as defined by the following claims.

What is claimed is:

1. A method of printing which comprises:

(a) providing a record receiving surface;

(b) providing a movable printhead having a set of marking elements greater in number than used for printing a single line, a registration mark forming element and a registration mark detector;

(c) advancing said record receiving surface in line by line increments;

(d) moving said printhead across said record receiving surface, in a direction transverse to said advancing direction, at each line location;

(e) generating printing marks upon said record receiving surface with a subset of said set of marking elements as said printhead is moved in said transverse direction along each printline and generating a registration mark; upon said record receiving surface as said printhead is moved in said transverse direction along each print line, with said registration mark forming element;

(f) detecting said registration mark with said registration mark detector and generating an output signal therefrom;

(g) using said output signal as a measure of the relative location between said printhead location on a given print line and said registration mark location of the preceding print line; and (h) selecting and activating a subset of said set of marking elements in accordance with said output signal for printing said subsequent given print line.

2. A printhead for a scanning printhead serial printer for placing printing marks upon a record receiving surface moved in line increments in an advancing direction, said printhead comprising:

(a) means for moving said printhead in a scanning direction which is transverse to said advancing direction;

(b) an array of scanning marking elements greater in number than used for printing on a single line, (c) a registration mark marking element, and (d) a registration mark detector.

3. A method of thermal transfer printing which comprises:

(a) providing a record receiving surface;

(b) providing a movable printhead supporting an array of heating elements greater in number than used for printing a single line, a registration line heating element, and a registration line detector;

(c) providing a thermal transfer ink donor ribbon between said printhead and said record receiving surface;

(d) providing a strip of coating on a portion of said ink donor ribbon for forming a colorless registration line on said record receiving surface;

(e) aligning said array of heating elements with said thermal transfer ink donor ribbon and said registration line heating element with said strip of coating;

(f) advancing said record receiving surface in line by line increments;

(g) moving said printhead across said ink donor ribbon, in a direction transverse to said advancing direction, while heating a subset of said array of heating elements to form printing marks on said record receiving surface, and while heating said registration line heating element to form a registration line on said record receiving surface;

(h)detecting said registration linewith said detector and generating an output signal indicative of the location of said registration line:

(i) using said output signal from said detector as a measure of the relative location between said printhead location on a given printline and said registration line location of the preceding printline; and (g) selecting and activating a subset of said array of heating elements in accordance with said output signal for printing said given printline.

4. The method of claim 3 wherein said record receiving surface is advanced a distance less than the printing height of said array.

5. A printhead for a scanning printhead thermal transfer printer for placing printing marks upon a record receiving surface moved in line increments in an advancing direction, said printhead comprising:

(a) means for moving said printhead in a scanning direction which is transverse to said advancing direction;

(b) an array of heating elements greater in number than used for printing a single line, (c) a registration line heating element, and (d) a registration line detector.

6. A scanning printhead thermal transfer printing apparatus which comprises:

(a) means for supporting and advancing a record receiving surface for movement in line by line increments;

(b) a movable printhead for forming printing images and a registration line on said record receiving surface, said printhead including an array of heating elements, extending in said advancing direction, greater in number than used for printing a single line, a registration line heating element and a registration line detector;

(c) a ribbon supply spool and a ribbon take-up spool for supporting and advancing an ink donor ribbon between said printhead and said record receiving surface;

(d) means for moving said printhead along a print line in a direction perpendicular to the direction of advance of said record receiving member; and (e) means for raising and lowering said ink donor ribbon.

* * * * *